United States Patent
Subramaniam

(10) Patent No.: US 10,712,040 B2
(45) Date of Patent: Jul. 14, 2020

(54) HVAC BLOWER

(71) Applicant: Lennox Industries Inc., Richardson, TX (US)

(72) Inventor: Palanivel Subramaniam, Richardson, TX (US)

(73) Assignee: Lennox Industries Inc., Richardson, TX (US)

( * ) Notice: Subject to any disclaimer, the term of this patent is extended or adjusted under 35 U.S.C. 154(b) by 136 days.

(21) Appl. No.: 15/671,438

(22) Filed: Aug. 8, 2017

(65) Prior Publication Data

US 2019/0049131 A1 Feb. 14, 2019

(51) Int. Cl.
*F24F 11/30* (2018.01)
*F24F 11/77* (2018.01)
*F24F 110/00* (2018.01)

(52) U.S. Cl.
CPC ............... *F24F 11/77* (2018.01); *F24F 11/30* (2018.01); *F24F 2110/00* (2018.01); *F24F 2221/50* (2013.01)

(58) Field of Classification Search
CPC ........ F24F 11/77; F24F 11/30; F24F 2221/50; F24F 11/0001
See application file for complete search history.

(56) References Cited

U.S. PATENT DOCUMENTS

| 7,538,509 | B1 | | 5/2009 | Glover et al. | |
| 10,143,107 | B1 | * | 11/2018 | Zuo | ................ H05K 7/20209 |
| 2003/0173830 | A1 | | 9/2003 | Smith et al. | |
| 2008/0304229 | A1 | | 12/2008 | June et al. | |
| 2011/0146651 | A1 | * | 6/2011 | Puranen | ................ F24D 5/04 |
| | | | | | 126/116 A |
| 2013/0345995 | A1 | * | 12/2013 | Shah | ................ G01F 1/05 |
| | | | | | 702/47 |
| 2018/0142914 | A1 | * | 5/2018 | Seo | ................ F24F 11/64 |

FOREIGN PATENT DOCUMENTS

JP 2015015667 A 1/2015

OTHER PUBLICATIONS

European Patent Office, Extended European Search Report, Application No. 18186870.4, dated May 20, 2019, 9 pages.

* cited by examiner

*Primary Examiner* — Vivek K Shirsat
*Assistant Examiner* — Ko-Wei Lin
(74) *Attorney, Agent, or Firm* — Baker Botts L.L.P.

(57) ABSTRACT

An apparatus includes a processor and a blower drive. The processor receives an altitude and a first blower coefficient. The processor determines a second blower coefficient based on the first blower coefficient and the altitude. The blower drive receives the second blower coefficient and adjusts at least one of a speed and a torque of a motor based on the second blower coefficient.

18 Claims, 3 Drawing Sheets

HVAC BLOWER

TECHNICAL FIELD

This disclosure relates generally to heating, venting, and air conditioning (HVAC).

BACKGROUND

HVAC systems are used to heat and cool spaces, such as residential dwellings or commercial buildings. These HVAC systems may include blowers that move air within and throughout the system.

SUMMARY OF THE DISCLOSURE

According to an embodiment, an apparatus includes a processor and a blower drive. The processor receives an altitude and a first blower coefficient. The processor determines a second blower coefficient based on the first blower coefficient and the altitude. The blower drive receives the second blower coefficient and adjusts at least one of a speed and a torque of a motor based on the second blower coefficient.

According to another embodiment, a method includes receiving an altitude and a first blower coefficient. The method also includes determining a second blower coefficient based on the first blower coefficient and the altitude. The method further includes receiving the second blower coefficient and adjusting at least one of a speed and a torque of a motor based on the second blower coefficient.

According to yet another embodiment, a system includes a load, a heater, and a blower. The load uses a refrigerant to cool air. The heater heats the air. The blower moves the air using a motor. The blower also receives an altitude and a first blower coefficient. The blower further determines a second blower coefficient based on the first blower coefficient and the altitude and adjusts at least one of a speed and a torque of the motor based on the second blower coefficient.

Certain embodiments provide one or more technical advantages. For example, an embodiment improves the efficiency of an HVAC system by adjusting the amount of air moved by a blower based on the altitude. As another example, an embodiment allows the HVAC system to increase airflow when the air density is lower. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
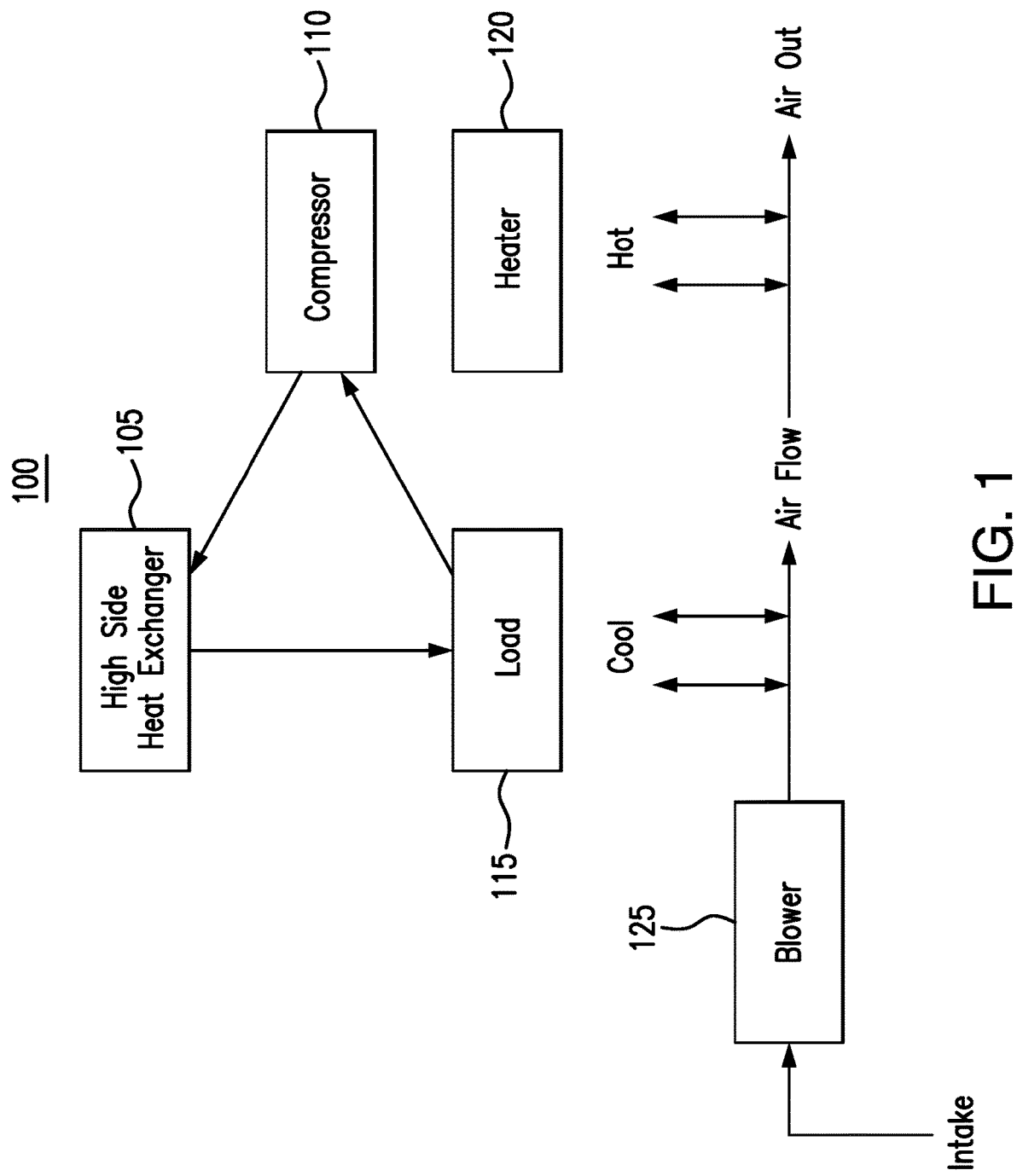
FIG. 1 illustrates an HVAC system.
Figure 2:
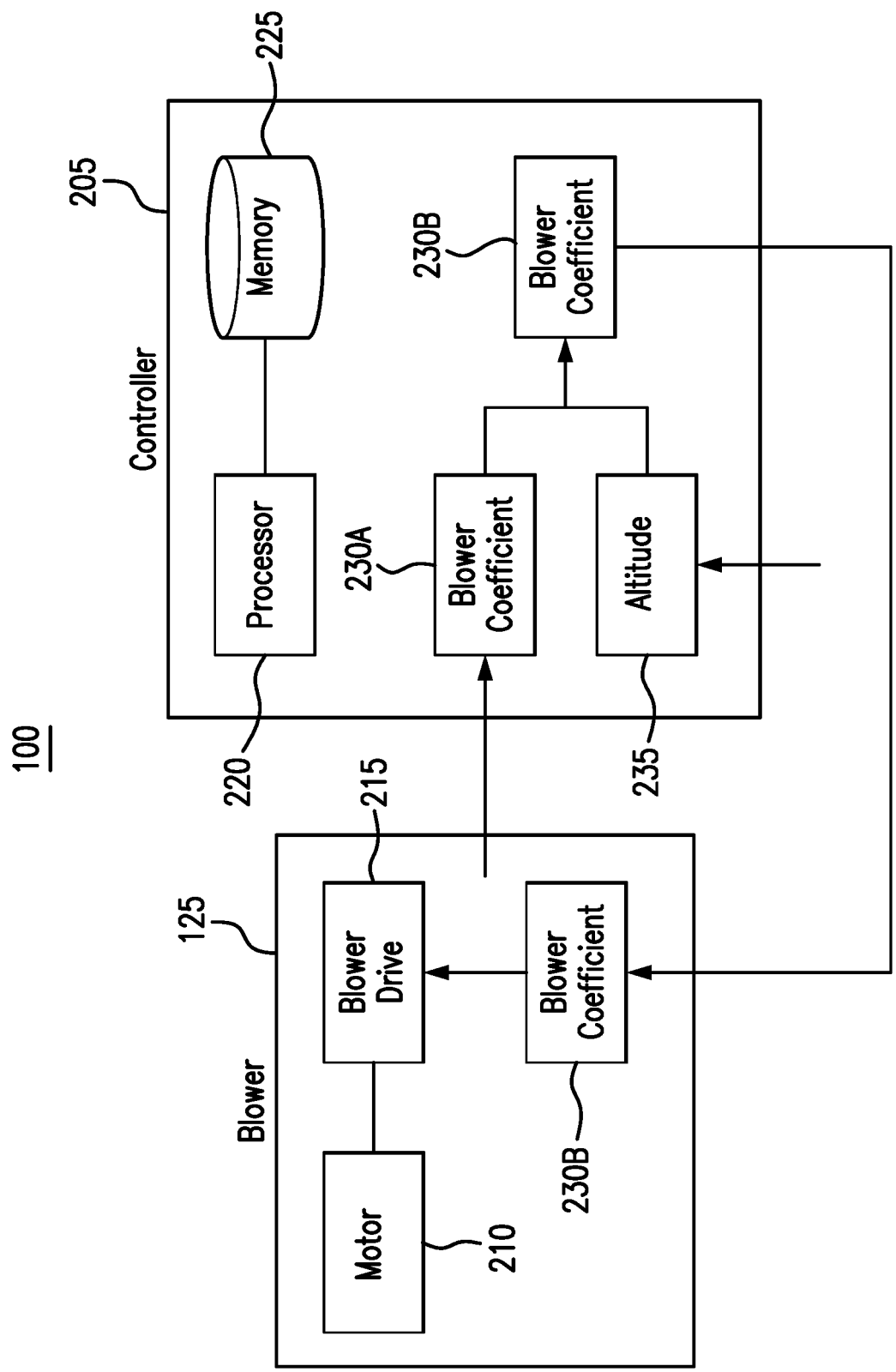
FIG. 2 illustrates certain components of the HVAC system of FIG. 1.
Figure 3:
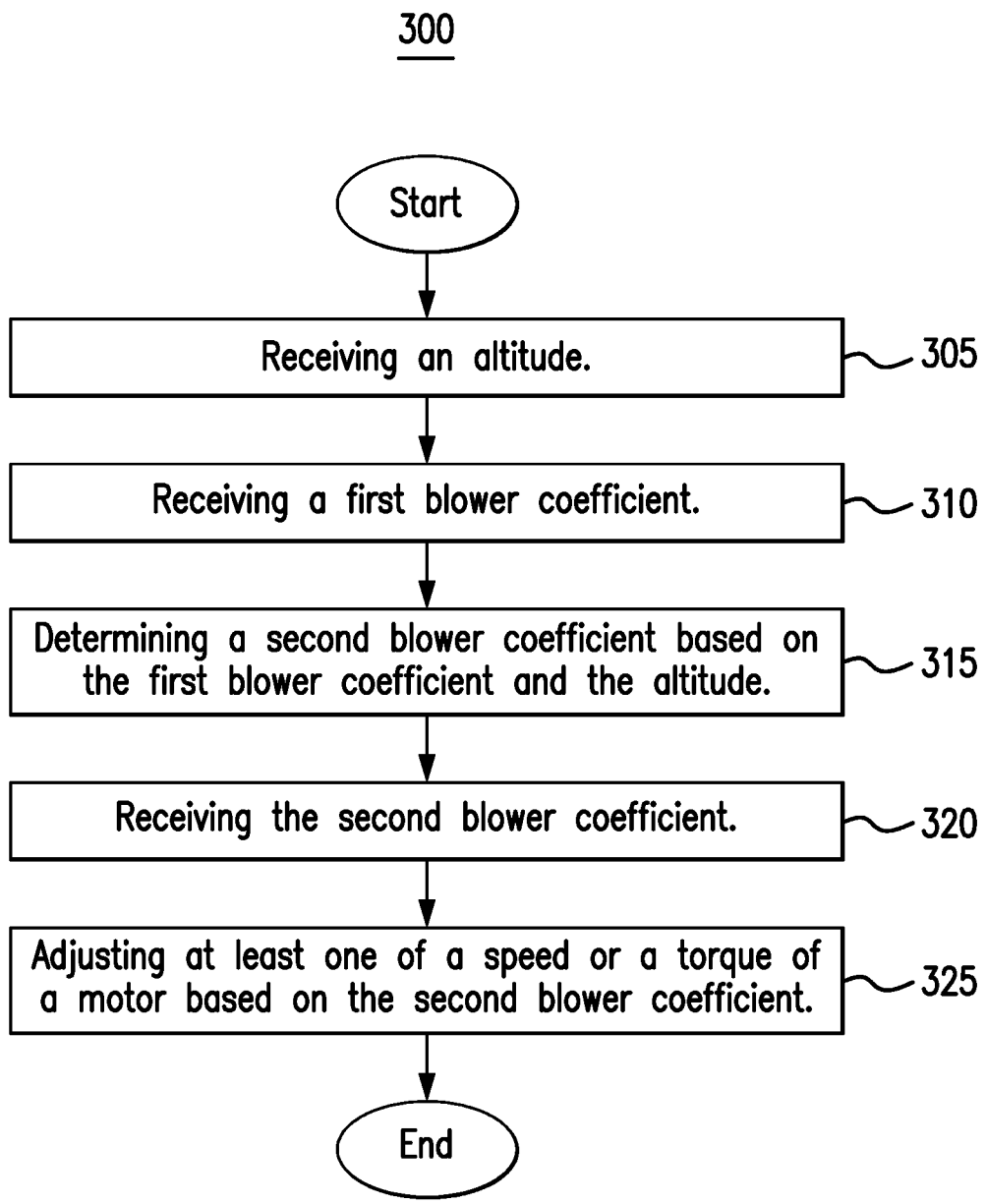
FIG. 3 is a flowchart illustrating a method for adjusting airflow in the system of FIG. 1.

Embodiments of the present disclosure and its advantages are best understood by referring to FIGS. 1 through 3 of the drawings, like numerals being used for like and corresponding parts of the various drawings.

Heating, venting and air conditioning (HVAC) systems are used to heat and cool spaces such as residential dwellings or commercial buildings by circulating heated or cooled air throughout those spaces. The systems are typically controlled based on the season. For example, during the summer the air conditioning portion of the system is active. During the winter the heating portion of the system is active.

HVAC systems may include blowers that move heated or cooled air within and throughout the HVAC system. The blowers may use a motor to turn blades, paddles, or other components to move or cycle air. In conventional HVAC systems, such as residential HVAC systems, the blowers may be cubic foot per minute (CFM) blowers. These blowers are configured to move a constant volume of air per unit of time (e.g., per minute). The air is heated or cooled and circulated throughout the dwelling. The configuration for these blowers conventionally assumed a particular air density or altitude of the HVAC system installation. However, if the HVAC system was installed at a lower or higher altitude, then the blower may end up moving too much or too little air respectively. For example, if an HVAC system is installed at a higher altitude, then the air density is lower than the assumed air density which results in the blower moving a constant volume of a lower density air. This causes the blower to move a lesser amount of air over a period of time. As a result, less heated or cooled air is circulated in the system, and the HVAC system may be less efficient in heating or cooling the dwelling.

This disclosure contemplates an improved HVAC system that adjusts the operation of the blower based on the altitude of the HVAC installation. The HVAC system receives or determines the altitude of the HVAC installation and adjusts a speed or a torque of the blower based on the altitude. As a result, the blower moves an appropriate amount of air per unit time to heat or cool a space in certain embodiments. The HVAC system will be described using FIGS. 1 through 3. FIG. 1 will describe the HVAC system generally. FIGS. 2 and 3 will describe the HVAC system in more detail.

FIG. 1 illustrates an HVAC system 100. As illustrated in FIG. 1, system 100 includes a high side heat exchanger 105, a compressor 110, a load 115, a heater 120, and a blower 125. Although conventional HVAC systems include additional components, these components have not been illustrated in FIG. 1 to improve the clarity of FIG. 1. One of ordinary skill in the art would understand that system 100 includes these unillustrated components (e.g., accumulators, oil separators, flash tanks, additional compressors, additional blowers, etc.). In particular embodiments, system 100 is more efficient over conventional systems because it adjusts blower 125 based on the altitude of HVAC system 100.

System 100 includes two portions: a cooling portion and a heating portion. The cooling portion includes high side heat exchanger 105, compressor 110, and load 115. The heating portion includes heater 120. Generally, the cooling portion is used to cool air while the heating portion is used to heat air.

High side heat exchanger 105 may remove heat from a refrigerant. When heat is removed from the refrigerant, the refrigerant is cooled. This disclosure contemplates high side heat exchanger 105 being operated as a condenser, a fluid cooler, and/or a gas cooler. When operating as a condenser, high side heat exchanger 105 cools the refrigerant such that the state of the refrigerant changes from a gas to a liquid. When operating as a fluid cooler, high side heat exchanger 105 cools liquid refrigerant and the refrigerant remains a liquid. When operating as a gas cooler, high side heat exchanger 105 cools gaseous refrigerant and the refrigerant remains a gas. In certain configurations, high side heat exchanger 105 is positioned such that heat removed from the refrigerant may be discharged into the air. For example, high side heat exchanger 105 may be positioned on a rooftop so that heat removed from the refrigerant may be discharged into the air. As another example, high side heat exchanger 105 may be positioned external to a building and/or on the side of a building.

Refrigerant may flow from high side heat exchanger 105 to load 115. Load 115 may use the refrigerant to remove heat from air proximate load 115. For example, load 115 may be a coil or plate that conducts heat. As the refrigerant passes through the coil or plate, it absorbs heat from the air outside the coil or plate, thus cooling that air. This disclosure contemplates load 115 including any structure such as coils, plates, fins, tubes, rods, etc. As the refrigerant absorbs heat from the air, the refrigerant may become warmer or hotter.

Refrigerant may flow from low load 115 to compressor 110. This disclosure contemplates system 100 including any number of compressors 110. The compressor 110 may be configured to increase the pressure of the refrigerant. As a result, the heat in the refrigerant may become concentrated and the refrigerant may become a high pressure gas in certain embodiments. When the heat in the refrigerant is concentrated, it becomes easier to remove and discharge that heat. Compressor 110 may send compressed refrigerant to high side heat exchanger 105, which removes concentrated heat from the compressed refrigerant.

Heater 120 receives air and heats that air to produce a warmer air. Heater 120 may be any component that adds energy to the surrounding air. This disclosure contemplates heater 350 including any appropriate components such as for example a furnace, a boiler, and/or a heat pump. This disclosure further contemplates heater 350 using gas or electric supplies to provide a heating source.

Blower 125 intakes air and then blows or pushes the air out. Blower 125 may include components such as a motor and a fan that operate to intake and then blow or move air through system 100. As the air moves through system 100, it is either cooled by the cooling portion or heated by the hearing portion of system 100. The cooled or heated air is then moved throughout the rest of the dwelling to cool or heat the dwelling.

Blower 125 may be a constant volume blower, meaning that blower 125 moves a constant volume of air per unit time (e.g., per minute). However, depending on the altitude of the installation of HVAC system 100, blower 125 may move more or less air. For example, if the altitude of HVAC system 100 increases, then blower 125 may move less air because the air density is lower at higher altitudes. Thus, even though blower 125 moves the same volume of air per unit time, it is actually moving less air per unit time due to the reduced air density. As a result of less air being moved, system 100 becomes less efficient at heating or cooling a dwelling.

System 100 may compensate for changes in altitude and air density by adjusting the speed or torque of blower 125 based on the altitude of system 100. For example, an installer may input the altitude of system 100 and system 100 may determine the speed or torque of blower 125 based on that altitude. As another example, system 100 may detect its altitude and adjust the speed or torque of blower 125 based on that detected altitude. As yet another example, system 100 may request an altitude from an internet server and then adjust the speed or torque of blower 125 based on the received altitude.

In particular embodiments, by adjusting the speed or torque of blower 125, system 100 may improve the efficiency at which it cools or heats a space. For example, by increasing the speed or torque of blower 125 at higher altitudes, system may more efficiently cool or heat the space at higher altitudes.

FIG. 2 illustrates certain components of the HVAC system 100 of FIG. 1. As illustrated in FIG. 2, HVAC system 100 includes a blower 125 and a controller 205. In certain embodiments, controller 205 improves the efficiency of system 100 by adjusting blower 125 based on the altitude of system 100.

Blower 125 includes a motor 210 and a blower drive 215. Blower drive 215 may control motor 210. Motor 210 may operate to move or circulate air through blower 125. For example, motor 210 may turn blades or fins at a certain speed or torque to push and/or move air through blower 125 and system 100. Blower 125 is a constant cubic feet per minute blower in certain embodiments. In other words, blower 125 operates to move a constant cubic feet per minute of air when operating. In some embodiments, blower 125 is a centrifugal blower. When the altitude of system 100 is higher, the air density lowers. As a result, blower 125 may move less air per volume of air moved. To compensate for the reduced air density, the speed or torque of motor 210 should be increased so that additional volume of air is moved by blower 125 per unit time.

Blower drive 215 controls motor 210. For example, blower drive 215 may control or adjust the speed or torque of motor 210. By increasing or decreasing the speed or torque of motor 210, blower 125 may move more or less volume of air per unit time. Blower drive 215 determines the speed or torque of motor 210 based on blower coefficient 230. Blower drive 215 determines blower coefficient 230 in some embodiments. In certain embodiments, blower drive 215 receives blower coefficient 230 from other components of system 100, such as controller 205. This disclosure contemplates blower drive 215 controlling motor 210 using any number of blower coefficients 230. For example, blower drive 215 may operate using a set of blower coefficients.

Controller 205 may control the operation of components of system 100 such as, for example, blower 125. In particular embodiments, controller 205 forms part of a thermostat. In some embodiments, controller 205 forms part of blower 125. For example, although not explicitly illustrated in FIG. 2, controller 205 may be integrated with blower drive 215 or be included in blower drive 215 such that blower drive 215 includes the components of controller 205 described herein and performs any of the functions of controller 205 described herein. In some embodiments, controller 205 forms part of high side heat exchanger 105, compressor 110, load 115, and/or heater 120 (e.g., an air handler controller (AHC) or integrated furnace controller (IFC)). This disclosure contemplates controller 205 being part of any component of system 100 or as a standalone component. Controller 205 includes a processor 220 and a memory 225. This disclosure contemplates processor 220 and memory 225 being configured to perform any of the operations of controller 205 discussed herein.

Processor 220 is any electronic circuitry, including, but not limited to microprocessors, application specific integrated circuits (ASIC), application specific instruction set processor (ASIP), and/or state machines, that communicatively couples to memory 225 and controls the operation of controller 205. Processor 220 may be 8-bit, 16-bit, 32-bit, 64-bit or of any other suitable architecture. Processor 220 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 220 may include other hardware and software that operates to control and process information. Processor 220 executes software stored on memory to perform any of the functions described herein. Processor 220 controls the operation and administration of controller 205 by processing information received from other components of system 100. Processor 220 may be a programmable logic device, a microcontroller, a microprocessor, any suitable processing device, or any suitable combination of the preceding. Processor 220 is not limited to a single processing device and may encompass multiple processing devices.

Memory 225 may store, either permanently or temporarily, data, operational software, or other information for processor 220. Memory 225 may include any one or a combination of volatile or non-volatile local or remote devices suitable for storing information. For example, memory 225 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 225, a disk, a CD, or a flash drive. In particular embodiments, the software may include an application executable by processor 220 to perform one or more of the functions described herein.

Controller 205 may receive a first blower coefficient 230A from blower 125. Blower drive 215 may use blower coefficient 230A to operate motor 210. For example, blower coefficient 230A may indicate to blower drive 215 at what speed or torque motor 210 should be set. Blower coefficient 230 A may be a set of blower coefficients.

Controller 205 may receive an altitude 235. In certain embodiments, altitude 235 may be the altitude of system 100. In some embodiments, altitude 235 may be the altitude of blower 125. Controller 205 may adjust blower 125 based on the received altitude 235. For example, controller 205 may determine a second blower coefficient 230B as a function of blower coefficient 230A and altitude 235.

In some embodiments, system may include a sensor such as, for example, an air density sensor and/or an altitude sensor that detects altitude 235 or an air density. The sensor then communicates the detected altitude 235 or air density to controller 205. Controller 205 then determines blower coefficient 230B from the received altitude 235 or air density. In some embodiments, the sensor may be part of a thermostat.

In particular embodiments, controller 205 has an Internet connection through which it communicates a location of blower 125 to a server. For example, controller 205 may communicate a zip code or a name of a city to the server. The server may then look up the altitude of the zip code or location and communicate that altitude 235 to controller 205. Controller 205 may then determine blower coefficient 230B using the received altitude 235. In some embodiments, the server may return to controller 205 blower coefficient 230B. In other words, controller 205 may communicate a location to the server and in response the server communicates the appropriate blower coefficient 230B for blower 125. Blower coefficient 230B may be a set of blower coefficients.

Controller 205 may determine blower coefficient 230B in any manner. For example, controller 205 may calculate blower coefficient 230B using equations that express blower coefficient 230B as a function of blower coefficient 230A and altitude 235. As another example, controller 205 may store a database (e.g., a table) that maps blower coefficient 230A and altitude 235 with values for blower coefficient 230B. Controller 205 may reference this database after receiving blower coefficient 230A and altitude 235 to determine blower coefficient 230B. As yet another example, controller 205 may communicate blower coefficient 230A and altitude 235 to an external server, and the server may return to controller 205 blower coefficient 230B.

Blower coefficient 230B may be different from blower coefficient 230A because it has been adjusted for altitude 235. Controller 205 may communicate blower coefficient 230B to blower 125. Blower 125 may then use blower coefficient 230B to adjust at least one of a speed or torque of motor 210. As a result, motor 210 may move a different volume of air per unit time. For example, blower coefficient 230B may indicate that the speed or torque of motor 210 is not high enough to move the appropriate amount of air for a given altitude 235. In response, blower drive 215 may increase one or more of the speed or torque of motor 210. In this manner, blower 125 may be adjusted to move different volumes of air per unit time based on the altitude and/or air density of HVAC system 100 in certain embodiments. As a result, system 100 may more efficiently cool or heat a space depending on the altitude of system 100.

In particular embodiments, system 100 includes a second blower 125. This disclosure contemplates system 100 including any number of blowers 125. The second blower 125 may include its own blower drive 215 and motor 210. The second blower 125 may receive blower coefficient 230B from controller 205 and adjust its motor's 210 speed or torque based on blower coefficient 230B.

As discussed above, this disclosure contemplates controller 205 being included in or as part of blower 125 and/or blower drive 215. Blower 125 and/or blower drive 215 may perform any of the functions of controller 205 described herein, such as for example, receiving blower coefficient 230A and altitude 235 and determining blower coefficient 230B.

FIG. 3 is a flowchart illustrating a method 300 for adjusting air flow in the system 100 of FIG. 1. In particular embodiments, components of system 100 such as controller 205 and blower 125 perform method 300. By performing method 300, the efficiency of system 100 may be improved in certain embodiments.

Controller 205 may begin by receiving an altitude in step 305. In step 310, controller 205 receives a first blower coefficient. In some embodiments, controller 205 receives the first blower coefficient from blower 125. Controller 205 then determines a second blower coefficient based on the first blower coefficient and the altitude in step 315. In step 320, blower 125 receives the second blower coefficient. Blower 125 then adjusts at least one of a speed or a torque of a motor based on the second blower coefficient in step 325.

Modifications, additions, or omissions may be made to method 300 depicted in FIG. 3. Method 300 may include more, fewer, or other steps. For example, steps may be performed in parallel or in any suitable order. While discussed as system 100 (or components thereof) performing the steps, any suitable component of system 100 may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a processor configured to:
receive an altitude that is higher than a predetermined altitude;
receive a first blower coefficient corresponding to the predetermined altitude; and
determine a second blower coefficient based on the first blower coefficient and the received altitude;
a blower drive communicatively coupled to the processor, the blower drive configured to:
receive the second blower coefficient; and
increase at least one of a speed and a torque of a motor based on the second blower coefficient.

2. The apparatus of claim 1, further comprising a sensor configured to:
detect the altitude; and
communicate the altitude to the processor.

3. The apparatus of claim 1, further comprising a second blower drive communicatively coupled to the processor, the second blower drive configured to adjust at least one of a speed and a torque of a second motor based on the second blower coefficient.

4. The apparatus of claim 1, wherein the processor is configured to:
communicate a location of the blower drive to a server; and
receive the altitude from the server in response to communicating the location.

5. The apparatus of claim 1, further comprising a constant cubic feet per minute blower comprising the motor.

6. The apparatus of claim 1, wherein the processor is further configured to:
communicate a location of the blower drive to a server; and
receive a third blower coefficient from the server in response to communicating the location, wherein the blower drive is further configured to adjust at least one of the speed and the torque of the motor based on the third blower coefficient.

7. A method comprising:
receiving an altitude that is higher than a predetermined altitude;
receiving a first blower coefficient corresponding to the predetermined altitude; and
determining a second blower coefficient based on the first blower coefficient and the received altitude;
receiving the second blower coefficient; and
increasing at least one of a speed and a torque of a motor based on the second blower coefficient.

8. The method of claim 7, further comprising:
detecting the altitude; and
communicating the altitude to the processor.

9. The method of claim 7, further comprising adjusting at least one of a speed and a torque of a second motor based on the second blower coefficient.

10. The method of claim 7, further comprising:
communicating a location of the blower drive to a server; and
receiving the altitude from the server in response to communicating the location.

11. The method of claim 7, wherein a constant cubic feet per minute blower comprises the motor.

12. The method of claim 7, further comprising:
communicating a location of the blower drive to a server; and
receiving a third blower coefficient from the server in response to communicating the location, wherein the blower drive is further configured to adjust at least one of the speed and the torque of the motor based on the third blower coefficient.

13. A system comprising:
a load configured to use a refrigerant to cool air;
a heater configured to heat the air;
a processor configured to:
receive an altitude that is higher than a predetermined altitude;
receive a first blower coefficient corresponding to the predetermined altitude; and
determine a second blower coefficient based on the first blower coefficient and the received altitude; and
a blower configured to:
move the air using a motor; and
increase at least one of a speed and a torque of the motor based on the second blower coefficient.

14. The system of claim 13, further comprising a sensor configured to:
detect the altitude; and
communicate the altitude to the blower.

15. The system of claim 13, further comprising a second blower configured to adjust at least one of a speed and a torque of a second motor based on the second blower coefficient.

16. The system of claim 13, wherein the blower is configured to:
communicate a location of the blower to a server; and
receive the altitude from the server in response to communicating the location.

17. The system of claim 13, wherein the blower is a constant cubic feet per minute blower.

18. The system of claim 13, wherein the blower is further configured to:
communicate a location of the blower to a server; and
receive a third blower coefficient from the server in response to communicating the location, wherein the blower is further configured to adjust at least one of the speed and the torque of the motor based on the third blower coefficient.

* * * * *